United States Patent
Wojdyla

(10) Patent No.: US 8,793,197 B2
(45) Date of Patent: Jul. 29, 2014

(54) METHOD AND SYSTEM FOR CREATING AN ADDRESS BLOCK MOVE UPDATE BARCODE

(75) Inventor: Richard Wojdyla, Wadsworth, IL (US)

(73) Assignee: Bell and Howell, LLC, Durham, NC (US)

( * ) Notice: Subject to any disclaimer, the term of this patent is extended or adjusted under 35 U.S.C. 154(b) by 852 days.

(21) Appl. No.: 12/546,152

(22) Filed: Aug. 24, 2009

(65) Prior Publication Data
US 2011/0047100 A1    Feb. 24, 2011

(51) Int. Cl.
*G06F 17/00* (2006.01)
(52) U.S. Cl.
USPC .......................................................... 705/408
(58) Field of Classification Search
USPC .......................................................... 705/408
See application file for complete search history.

(56) References Cited

U.S. PATENT DOCUMENTS

| | | | |
|---|---|---|---|
| 6,278,988 B1 * | 8/2001 | Lau et al. .............................. 1/1 |
| 6,292,709 B1 * | 9/2001 | Uhl et al. ....................... 700/226 |
| 6,557,755 B1 | 5/2003 | Pickering, Jr. et al. |
| 6,865,561 B1 * | 3/2005 | Allport et al. .................. 705/406 |
| 2002/0029202 A1 * | 3/2002 | Lopez ............................ 705/406 |
| 2003/0172064 A1 * | 9/2003 | Snapp ............................... 707/5 |
| 2004/0061282 A1 * | 4/2004 | Stemmle ........................ 271/207 |
| 2006/0235710 A1 * | 10/2006 | Hodess et al. ..................... 705/1 |
| 2007/0299792 A1 * | 12/2007 | Pintsov et al. ................ 705/402 |
| 2010/0049536 A1 * | 2/2010 | Quine et al. ...................... 705/1 |

OTHER PUBLICATIONS

Austin American Statesman, "Postal Buddy Would Ease Task of Address Changes," Final Edition, Austin, Texas, Jan. 13, 1990, D6.*
U.S. Appl. No. 12/604,781, filed Oct. 23, 2009 by Marvin L. Isles et al.

* cited by examiner

*Primary Examiner* — Nathan Erb
(74) *Attorney, Agent, or Firm* — McDermott Will & Emery LLP

(57) ABSTRACT

The present subject matter generally relates to techniques and equipment to apply move update address information to mailpieces based on move update requirements. More particularly, the present subject matter relates to a pre-print move update process that updates addresses for moves without affecting stored address data while meeting postal authority standards for move update and pre-sort mailpiece groupings. The move update process is applied to the address data before print and preserves the initial stored address data. The move update address information and initial address information are both printed.

18 Claims, 5 Drawing Sheets

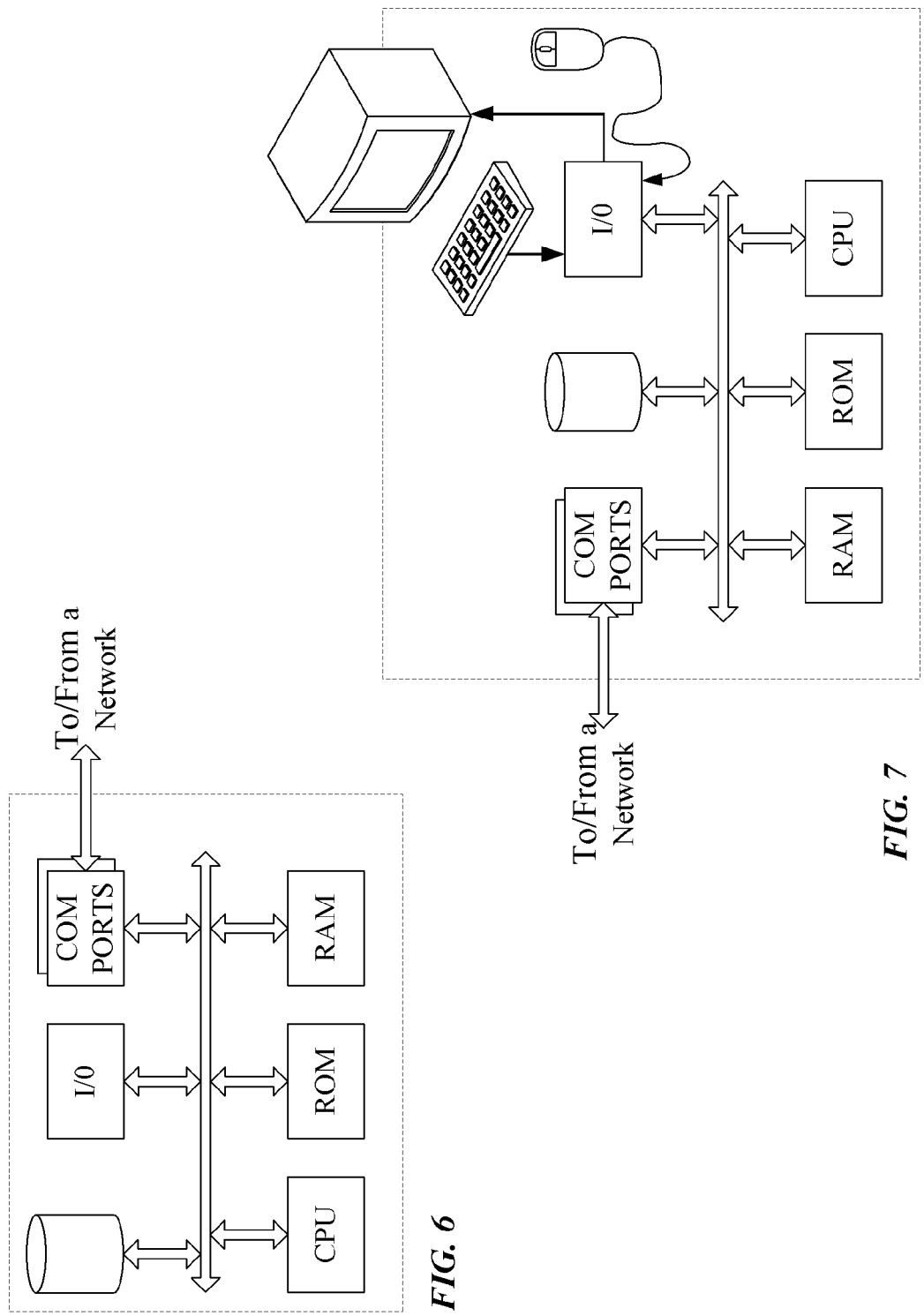

METHOD AND SYSTEM FOR CREATING AN ADDRESS BLOCK MOVE UPDATE BARCODE

TECHNICAL FIELD

The present subject matter relates to techniques and equipment to apply a barcode to mailpieces based on move update requirements.

BACKGROUND

Mailpieces with Undeliverable as Addressed (UAA) addresses, create a significant cost for the postal service since special handling is needed for each piece. Approximately 80% of the UAA mail is the result of individual or family moves. The postal authority has implemented many options to correct for moves. These include updating address lists before the mail is addressed and performing move updates on a mail sorter. However, many mail preparers have chosen to print their addresses on enclosures that enable the address to be seen through a windowed envelope. This address data is processed in a data center to ensure that the addresses are compliant with postal authority regulations, including address quality, move update and arranging the addresses in pre-sort order based on the delivery point.

However, many companies have business restrictions on the updating of address lists for moves without customer written approval. Move updates performed by the postal authority are acceptable and updates performed post print by a pre-sort operation using MLOCR are generally acceptable. Further constraints exist on updating addresses for moves post print on the output of an inserter since this process will inject pre-sort errors or require that mail be rejected and sent at the single piece postage rate. In addition, the balance of the mailing would be at a higher risk for failing the move update requirements for pre-sorted mail acceptance.

Hence a need exists for a pre-print move update process that updates addresses for moves without affecting the address data in the source data while meeting postal authority standards for move update and pre-sort mailpiece groupings.

SUMMARY

The teachings herein alleviate one or more of the above noted problems with a move update process that is applied to the address data before print, and preserves the original address in the source data and on the printed address.

In accord with the present concepts disclosed herein, there is provided a method for updating address data prior to printing address data on a mail document. The method includes performing, by way of a processor, move update address analysis on initial address data contained within records for move update processing to confirm the presence of a move update requirement. For at least one confirmed move update requirement, move address contextual data and postal authority barcode data containing postal authority delivery point data are created. The move update address contextual data and the postal authority barcode data are appended to associated address data. The appended data is stored in a format suitable for printing initial address information together with move update address information on a mail document.

In accord with the present concepts disclosed herein, there is provided a method for updating address data prior to printing address data. The method includes performing, by way of a processor, move update address analysis on initial address data contained within records for move update processing to confirm the presence of a move update requirement. For at least one confirmed move update requirement, move address contextual data and postal authority barcode data containing postal authority delivery point data are created. The move update address contextual data and the postal authority barcode data are appended to associated address data. Initial address information, together with move update address information, are printed on a mail item or exposed surface.

In accord with the present concepts disclosed herein, there is provided a system for updating address data prior to printing address data on a mail document. The system includes initial address data stored within records for move update processing. A processor is provided and is associated with the stored address data and records for move update processing. The processor is configured to perform move update address analysis on the initial address data contained within records for move update processing to confirm the presence of a move update requirement. For at least one confirmed move update requirement, the processor creates move address contextual data and postal authority barcode data containing postal authority delivery point data. The move update address contextual data and the postal authority barcode data are appended to associated address data. The processor generates a print file which is suitable for causing a printer to print a mail document, such that the mail document includes initial address information together with move update address information.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 illustrates a network or host computer platform, as may typically be used to implement a server.

FIG. 7 depicts a computer with user interface elements, as may be used to implement a personal computer or other type of work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
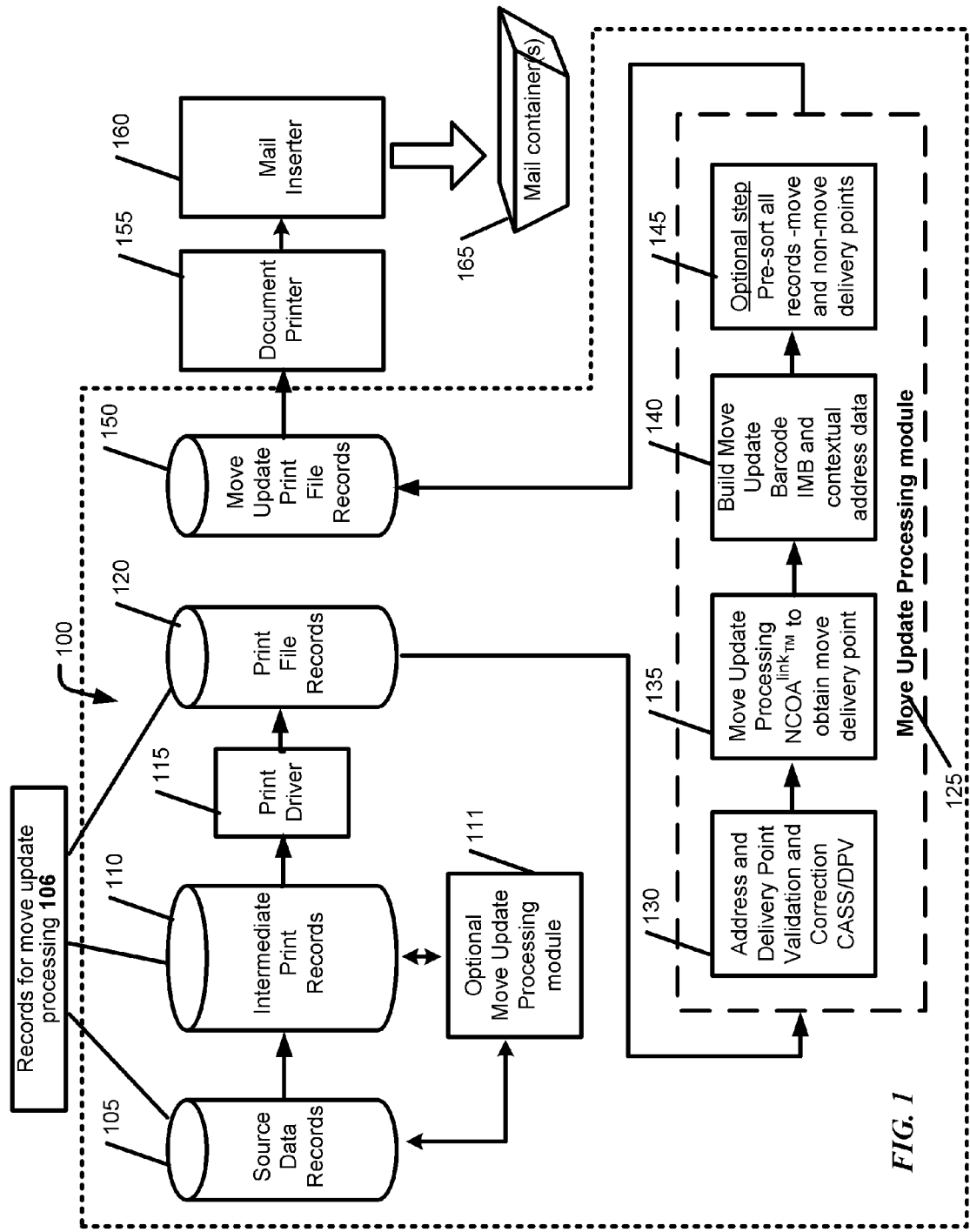
FIG. 1 is an exemplary functional flow diagram for the address move update process.
Figure 2:
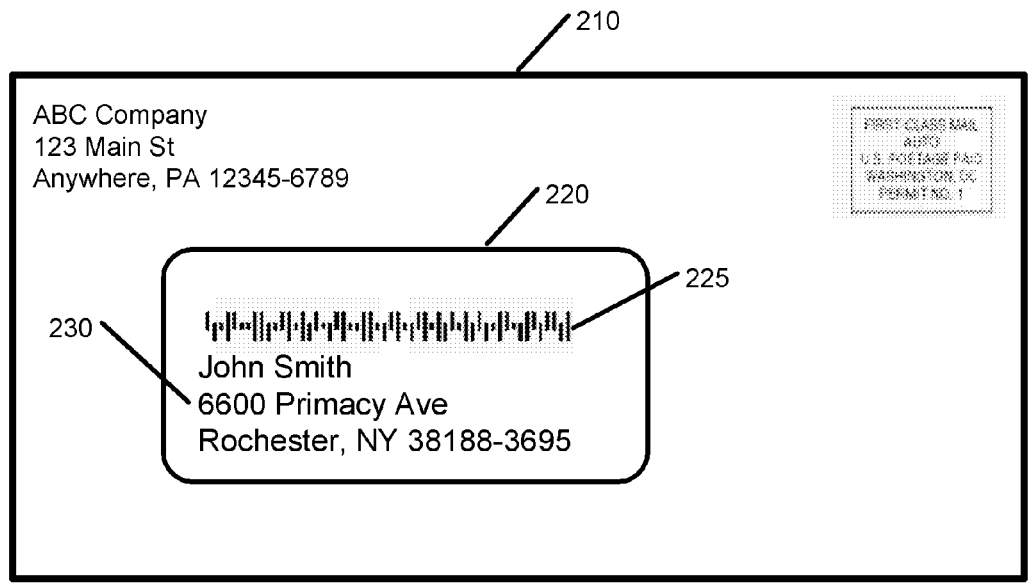
FIG. 2 is an exemplary diagram of a completed mailpiece with an address block postal authority barcode corresponding to an address that has not been move updated.

Reference now is made in detail to the examples illustrated in the accompanying drawings and discussed below. FIG. 1 illustrates the components required to update address data for moves, create a print file that is compatible with the move updates 100 and print 155 the documents, with updated addresses, for insertion into an envelope (FIG. 2, ref. num. 210 and FIG. 3, ref. num. 250) with a mail inserter 160. Source data records 105 are where the official customer address data is maintained along with other data that will be included in the printed document, such as financial data, cell phone usage data, costs incurred and numerous other items to be communicated to a customer. Many companies require that the official address data only be updated for moves when the customer has approved the change through written notification. Other aspects of address quality and format standardization may be corrected in the source data records, such as but not limited to CASS™, DPV®, LACSLink® and SuiteLink™ offered by the United States Postal Service (USPS®). The CASS™ system improves the accuracy of carrier route, Five-Digit ZIP™, ZIP+4, and delivery point codes that appear on mailpieces, DPV® verifies the physical existence of the delivery point, LACSLink® corrects for rural routes and street name changes and SuiteLink™ corrects for suite and apartment numbers. Other services may be added by the USPS® or different processes may be required by other postal authorities. FIG. 2 illustrates an envelope layout for an address that has not been updated using the techniques described herein. If any of the required services are not allowed by the company's business requirements, these corrections can be processed in a manner similar to the move update process explained herein.

Figure 3:
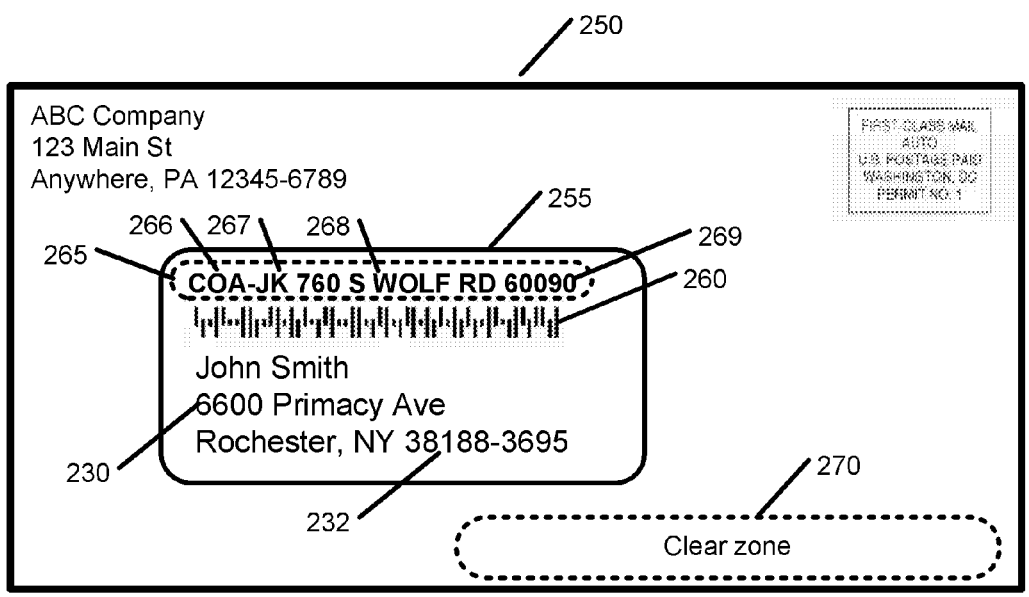
FIG. 3 is an exemplary diagram of a completed mailpiece with an address block postal authority barcode corresponding to a move updated address along with a contextual representation of the move address.

Restrictions on the correction of addresses for moves creates a problem associated with submitting a mailing for postage discounts. All addresses must meet move update requirements for a high percentage all of the moves in the current mailing being submitted to the postal authority for delivery at discounted pre-sort postage rates. A postal authority may be any of, but not limited to government affiliated entities (USPS®), private posts, courier services and delivery agents. In order to print the documents that will be inserted, the necessary data must be extracted from the source data records 105. Intermediate print records 110 may be created to contain the extracted data in the proper format for printing. The Bowe Bell+Howell Compose is an example of a product that performs this formatting function. In order to print the intermediate print records 110, print driver 115 is used to add the printer control codes needed to print the documents in a specified format. The output from the print driver 115 is the print file records 120. The move update processing module 125 will add move update information to the print file records 120 in a manner that preserves the integrity of source data records 105 while providing move update information as illustrated in FIG. 3. The first step in the move update processing module 125 is to validate that the address is deliverable as addressed using postal authority processes (CASS™, DPV®, etc.). These processes should have been completed on the source data record 105 addresses. However, since UAA addresses in the mailing may affect eligibility for postage discounts, the address quality test 130 is repeated. In addition, only addresses standardized in accordance with CASS™ can be used for move update.

Step 135 in FIG. 1 uses the standardized address and evaluates it against the postal authority change of address database. The USPS® process is NCOALink™. Input address information for NCOALink™ must first be standardized to conform to USPS® requirements, including the ZIP+4 code. An attempt is made to match each name and address against the NCOALink™ product. If a match is made with the name and old address information in the NCOALink™ file, then the NCOALink™ provides the current move information (new address or undeliverable status). Both a delivery point and new address are returned. For the USPS® the delivery point is an 11 digit number known as the ZIP. For the USPS®, the ZIP or ZIPCODE is a 5, 9 or 11 digit number that represents a delivery point associated with an address. Other formats may be used by other postal authorities. The move delivery point and move address contextual data is used in step 140 to create a delivery point barcode 260 (FIG. 3) and move address contextual data 265 (FIG. 3). The USPS® uses a 4-state Intelligent Mails Barcode (IMB) which contains the delivery point, mailer ID, unique identifier, and service and barcode indicators. The mailer ID, unique identifier, and service and barcode indicators may be extracted from the print file record or provided as part of the job setup. If the unique identifier is not in the print file record, a management module (not shown) will provide the next available number that is consistent with the postal authority requirements for uniqueness. The move address IMB 260 will be inserted into the print file record 120 as a replacement for the original postal authority delivery point barcode 225, such as but not limited to, an IMB or POSTNET 225 (FIG. 2). The address contextual data 265 (FIG. 2) will be inserted into the address block for the print file record 120 being processed.

In order to qualify for postage discounts, all of the document records must be ordered in the print file 120 in accordance with postal authority pre-sort requirements so that they will be printed in the correct pre-sort groupings of delivery points. The insertion of move updates into the print file records 120 will introduce unacceptable pre-sort errors that may result in disqualification for postage discounts. For the example in FIG. 3, the original 5 digit ZIP 232 is 38188 for Rochester, N.Y. while the move 5 digit ZIP 269 is 60090 for Wheeling, Ill. If the move mailpiece remains in the Rochester group it will be shipped to Rochester for processing, resulting in the same added cost as a UAA mailpiece. Therefore, the USPS® obtains zero cost avoidance for the move update. Step 145 (FIG. 1) corrects this error by repeating the pre-sort analysis for all the records, changed and unchanged, to correct these pre-sort errors. The completed move update print file records 150 are outputted from the move update processing module 125 and stored until the mailing is ready for printing. Since postage discounts can be earned for applying a CASS™ and the move update delivery point barcode and submitting the mail with out pre-sorting, the pre-sorting can be an optional step which is bypassed if the additional postage discounts are not being claimed.

The move update process 100 can be preformed with a variety of data processing resources such as, but not limited to a server, mainframe or personal computer. The one or more processors may be interconnected in a distributed network or run individually by performing a part of the job and storing intermediate results. Reference is made to FIGS. 6 and 7, discussed in further detail below, for additional data processing and hardware details.

Although there may be business restrictions to performing the move update processing module 125 other than on the print file records 120, those skilled in the art may devise other options. For example, the optional move update processing module 111 may perform the move updates on the intermediate print records 110 using essentially the same process as described for move update processing module 125. In addition, the optional move update processing module 111 can be used on the source data provided the move barcode 260 and the contextual data 265 is appended to data fields in the source data records 105. This ensures that the original address data is preserved in the source data records 105. The source data records 105, intermediate print records 110 and the print file records 120 all contain original address data that is updated for move updates by the move update processing module 125 or the optional move update processing module 111. The three sources of address data are referred to as records for move update processing 106. These records and their associated processes 111, 125 all extract address data from the associated record and add move update data (FIG. 3 260 and 265) as required to the associated records (105, 110 and 120) while preserving the original address data 230 and replacing the address block barcode 225 with the move update barcode 260.

When the mailing job is to be run, the move update print file records 150 are transferred to the printer 155 and the documents are printed in pre-sort order. Following printing, the documents are loaded onto an inserter 160 to manufacture the mailing. The documents, inserted into envelopes, will come out of the inserter in pre-sort order. The groups of pre-sorted mailpieces will be put into mail containers 165 in accordance with pre-sort rules. Mail containers maybe, but are not limited to trays, tubs, sacks or mail carriers.

Reference is made to FIG. 2 as an example of a mailpiece 210 that has not received move update changes. The mailpiece has a window 220 through which the addressee and address 230, printed on the enclosed document, can be viewed. In addition, the delivery point barcode 225 can also be viewed through the window. Optionally, the barcode 225 maybe printed below the address data 230. The barcode 225, 260 is not limited to the IMB which is shown. The existing POSTNET, UPC and 2-Dimentional barcodes are some other examples. Those skilled in the art may choose other options including alpha numeric strings.

The move update envelope 250 is illustrated in FIG. 3. The mailpiece has a window 255 through which the addressee and address 230, printed on the enclosed document, can be viewed. In addition, the move update delivery point barcode 260 can also be viewed through the window. Similarly, the move address contextual data 265 can be viewed through the window 255. The location of the barcode 260 and the contextual data 265 is not limited to the example in FIG. 3. The move update processing module 125 is capable of inserting these components wherever desired by the postal authority. For example, the contextual data 265 can be above or below the barcode 260 or above or below the addressee and address data 230. Similar flexibility exists for the barcode 260. One restriction is that both items must be visible through the window 255. In addition, the format of the contextual data 265 is flexible and may be redesigned by those skilled in the art. An objective is to have a machine recognizable indication that the barcode 260 is a move update barcode to prevent unnecessary processing. The COA 266 is such an indicator. There may be a need to identify the machine or process associated with the move update process. The JK 267 is such and indicator. Next is the street address with suite and apartment data 268. This is needed so that the carrier knows where to deliver the mailpiece and knows that is belongs to his/her carrier route. Finally, the city and state can be represented with the 5 digit ZIP 269. This move update process has left the postal authority clear zone 270 blank in case the area is needed by a pre-sort company or postal authority to add additional information. Other formats for the contextual data 265 may be required by the postal authority as new requirements are developed and these requirements will be incorporated by those skilled in the art.

Figure 4:
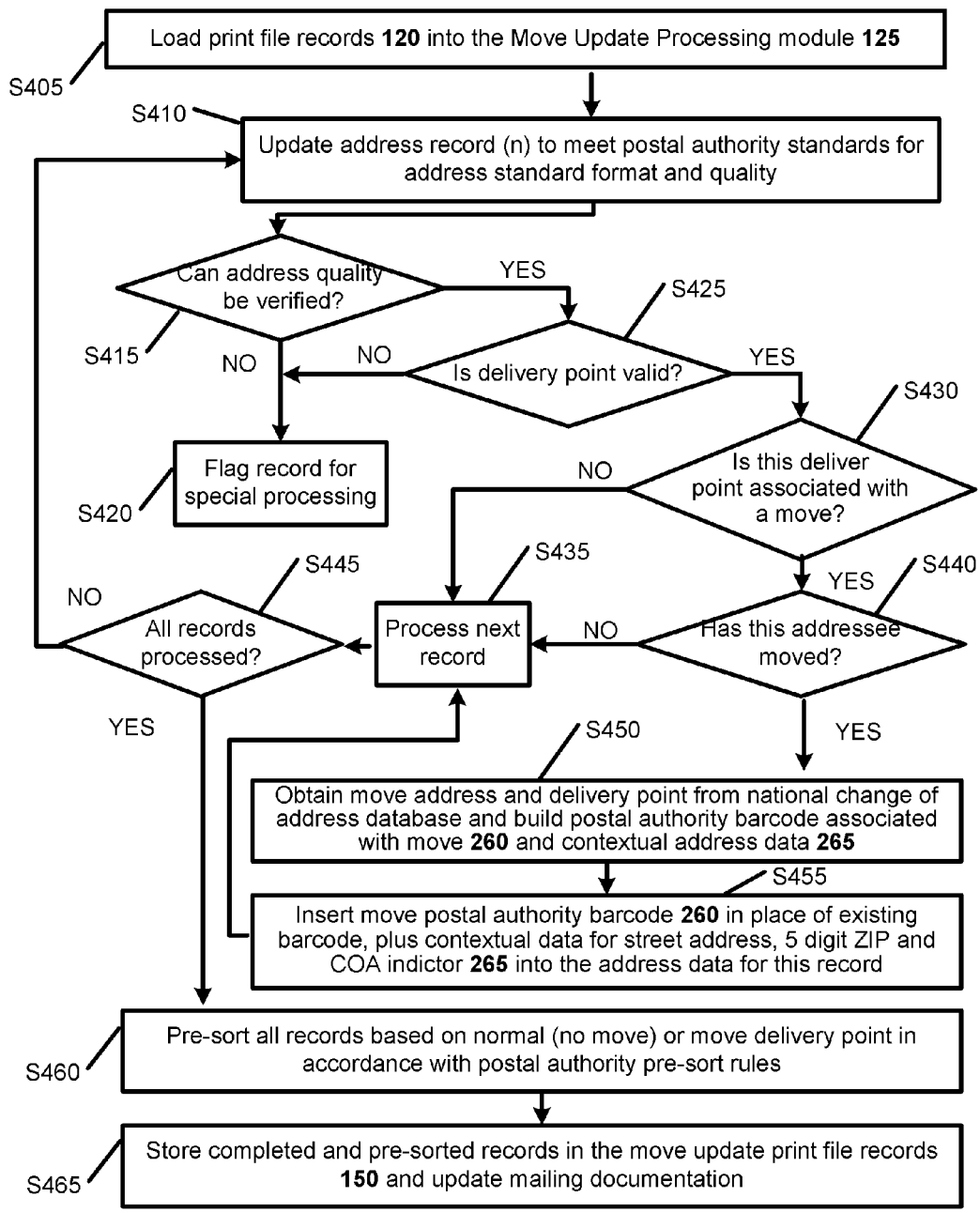
FIG. 4 is an exemplary flow chart of the move update processing module steps.

Turning now to FIG. 4 which is an exemplary flow chart of the move update processing module 125 steps. The process starts S405 by loading or accessing the print file records 120 by the move update processing module 125. As described above, the optional move update processing module 111 may perform similar steps on the source data records 105 or on the intermediate print records 110. Those skilled in the art will make the necessary changes to the process as required by different data structures. Since move update processing requires that the input address be in standardized format and meet quality standards (CASS), Step S410 is executed on each record before the address is processed for a move update. Step S410 may be optional if the address data can be certified that all addresses are CASS compliant. This certification can be achieved using address services on the address data. Address matching software, such as but not limited to, Mail Manager provided by BCC Software can be used. If an address can not be standardized or its quality verified S415, the address is flagged for special processing S420 since inclusion of this UAA address in the mailing will jeopardize the pre-sort postage discounts. An additional quality check S425 verifies that the delivery point is a valid physical delivery location, i.e. a building exists at 123 Main Street. If DPV® fails, special processing is required S420. Steps S410, S415. S420 and S425 related to the move update processing module block 130. Postal authority mail quality requirements are constantly changing which will require those skilled in the art to modify these steps to remain compliant.

The move update process starts by testing the valid delivery point against the move update database S430 to determine if this delivery point is associated with an address where an addressee or family have moved. If no move is detected the next record is processed S435 provided additional records are available for processing S445. When additional records are available, control is returned to step S410 to process the next record. The next step is to determine if the addressee has moved S440. If the addressee has not moved, control is passed to step S435 to process additional records. If the addressee has moved, the move address and delivery point ZIP are returned from the national change of address database S450. This data is used to create the contextual data and postal authority barcode 265 and 260 (FIG. 3). The data record associated with the address is updated S455 with the contextual data 265 and the barcode 260, using the format consistent with the file structure 120, 110 or 105. Those skilled in the art will use the file structure to control the placement of the contextual and barcode data within the address block that will be visible through the envelope window. Processing of the next record, if available, is performed next S435.

When all the records have been processed S445, all records are then be pre-sorted S460. The original delivery point or the move update delivery point is used by the pre-sort process to group the delivery points into groupings in accordance with postal authority requirements. The pre-sorting is required even if the original file was already pre-sorted in order to correct for pre-sort errors induced by the move updates. The finalized data records are used to build the move update print file records 150 (FIG. 1) S465 (FIG. 4). If utilized, the optional move update processing module 111 will perform move update on either the source data records 105 or the intermediate print records 110. Execution of subsequent processing steps 110, 115 as required will result in the creation of the move update print file records 150 without having to create the print file records 120.

During the creation of the mailing print file 105, 110, 115 and 120 (FIG. 1), the postal documentation required for submission of the mailing to the postal authority is created. This documentation in either electronic form or printed form is now in error due to the move updates. Reports such as, but not limited to, the postage summary report and the mail qualification report (mailpiece counts versus pre-sort groups) require updating. Detailed data associated with each mailpiece (required by the USPS® Full Service Intelligent Mail Barcode program) also requires corrections. Upon completion of this move update process, a print file, which is fully compliant with current postal authority requirements for address quality, move update, and pre-sort, is created and ready for printing and insertion to produce compliant mailpieces that can be submitted for delivery at discounted postage rates.

Figure 5:
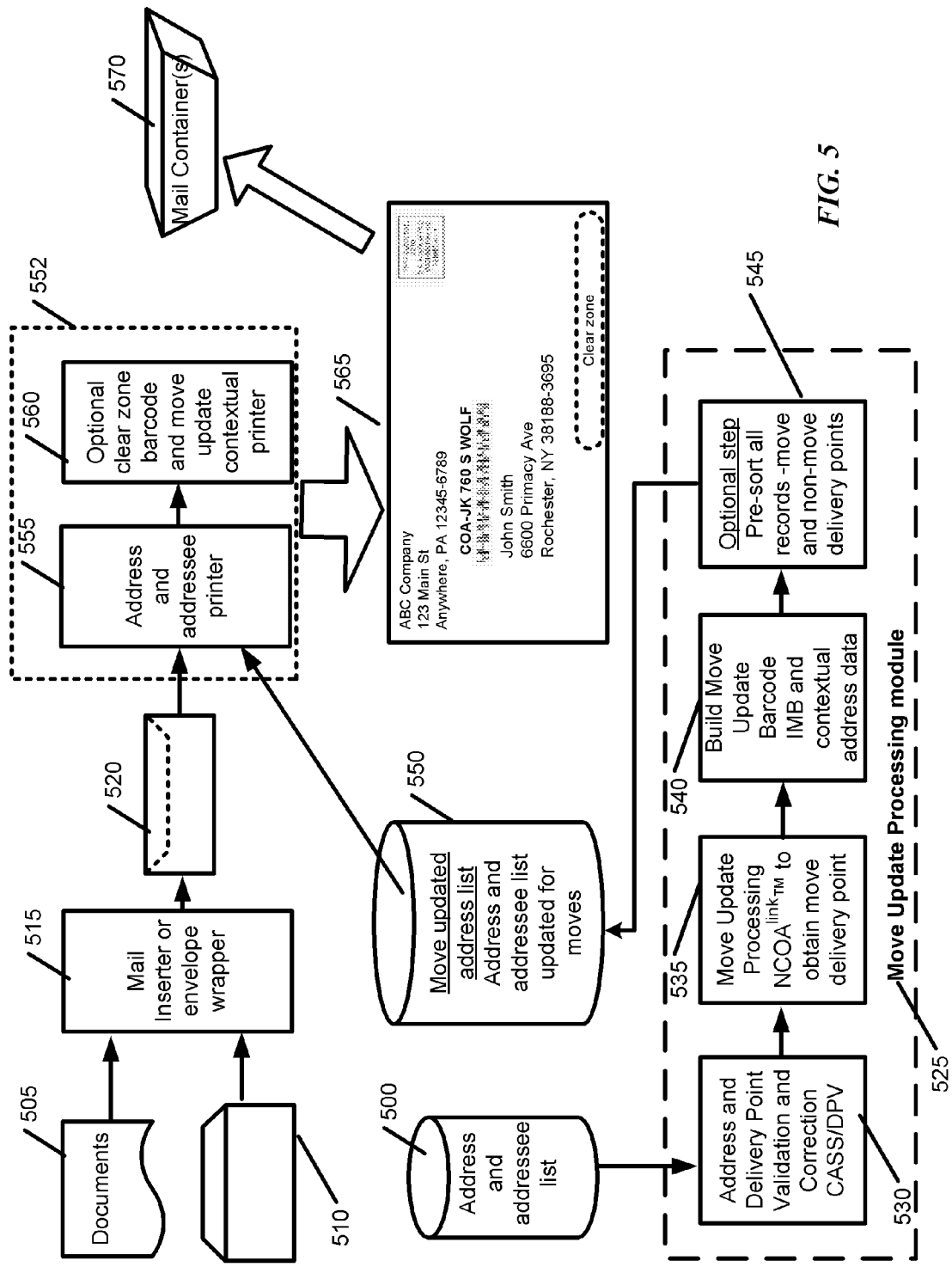
FIG. 5 is an exemplary functional for address move update on a closed envelope.

Attention is now directed to FIG. 5 for a description of an alternative approach to updating the address data for move update data and inserting the changes into move update print file records 150 before the documents are printed. Many document processing approaches print address data on numerous unaddressed mailpiece 520 types. Unaddressed mailpiece types may include, but not limited to a closed envelope after the contents 505 are inserted into and envelope 510 or the contents are wrapped and sealed to form an envelope. In addition, address printing is used on additional types of mailpieces, such as but not limited to, tri-folded sheets, material held closed with tabbing, periodicals and other bound material. These mailpiece types will require different processing steps that inserting 515. These techniques are well known by those skilled in the art of mail production. However, the same restriction exists on performing move update changes to the original address data 500. Hence, the move update processing module 525 is used to update the address list for moves and create a move updated address list 550 which contains the move update address data (FIG. 3 265, 260) along with the original address data 230. The move update address data can be printed above or below the original address 230. If the original address data included an postal authority approved barcode 225, this barcode will be deleted since the move delivery point barcode 260 will replace the original barcode 225. The move update processing module 525 steps will add move update information to the address and addressee list 500 to create a new file, move update address list 550. FIG. 3 shows an exemplary illustration of a printed mailpiece with the move address data showing the original address 230, a move delivery point barcode 260 and contextual move address data 265.

This move address format is a significant departure from the normal method of performing move update on an address list that is used to print on closed envelopes. Normally, the full address 230 would be replaced with the move address, thus erasing all tractability that the move has occurred. The new process preserves the original address data 230 and inserts the move contextual data 265 and move delivery point barcode 260. The preservation of the original address data is critical to meeting the business requirements against changing address data for move update without client approval.

The first step in the move update processing module 525 is to validate that the address is deliverable as addressed using postal authority processes (CASS, DPV . . . ). These processes should have been completed on the address and addressee list 500 addresses. However, since UAA addresses in the mailing may affect eligibility for postage discounts, the address quality test is repeated 530. In addition, only addresses standardized in accordance with CASS can be used for move update.

Step 535 uses the standardized address and evaluates it against the postal authority change of address database. The USPS® process is NCOALink™. Input address information for NCOALink™ must first be standardized to conform to USPS® requirements, including the ZIP+4® code. An attempt is made to match each name and address against the NCOALink™ product. If a match is made with the name and old address information in the NCOALink™ file, then the NCOALink™ provides the current move information (new address or undeliverable status). Both a delivery point and new address are returned. For the USPS® the delivery point is an 11 digit number known as the ZIP. For the USPS®, the ZIP or ZIPCODE is a 5, 9 or 11 digit number that represents a delivery point associated with an address. Other formats may be used by other postal authorities. The move delivery point and move address contextual data is used in step 540 to create a delivery point barcode 260 (FIG. 3) and move address contextual data 265 (FIG. 3). The USPS® uses a 4-state Intelligent Mail® Barcode IMB which contains the delivery point, mailer ID, unique identifier, and service and barcode indicators. The mailer ID, unique identifier, and service and barcode indicators may be extracted from the print file record or provided as part of the job setup. If the unique identifier is not in the print file record, a management module will provide the next available number that is consistent with the postal authority requirements for uniqueness. The move address IMB 260 will be inserted into the move update address list 550 as a replacement for the original postal authority delivery point barcode, such as but not limited to, IMB or POSTNET 225 (FIG. 2) or the data is added to the appropriate record. The address contextual data 265 (FIG. 3) will be inserted into the address block for the print file record 120 being processed. Alternately, the contextual move data 265 and move delivery point barcode 260 will be linked to the old address and printed in the clear zone 270 instead of the address block.

As an optional step, additional postage discounts can be earned by pre-sorting the move updated address list 550. In order to qualify for pre-sort postage discounts, all of the document records are ordered in the move update address list 550 in accordance with postal authority pre-sort requirements so that they will be printed in the correct pre-sort groupings of delivery points. The insertion of move updates into the move update address list 550 will introduce unacceptable pre-sort errors that may result in disqualification for postage discounts. For the example in FIG. 3, the original 5 digit ZIP 232 is 38188 for Rochester, N.Y. while the move 5 digit ZIP 269 is 60090 for Wheeling, Ill. If the move mailpiece remains in the Rochester group it will be shipped to Rochester for processing, resulting in the same added cost as a UAA mailpiece. Therefore the USPS® obtains zero cost avoidance for the move update. Step 545 corrects this error by repeating the pre-sort analysis for all the records, change and unchanged, to correct these pre-sort errors. The completed move update address list 550 is outputted from the move update processing module 525 and stored until the mailing is ready for address printing.

The mailpieces 520 will be processed immediately if the printing system 552 is connected to a mail processing system, such as but not limited to an inserter or wrapper. The printing system 552 can be stand alone with a feeder and stacker and process batches of mailpieces 520. The printer system 552 contains a printer 555 capable of printing the address, addressee, delivery point barcode 260 and contextual move data 265. Alternately, a separate printer may be used to print the delivery point barcode 260 and contextual move data 265 in the clear zone 270. This approach reduces the number of lines needed for the address data printing. Following the envelope printing, the completed envelopes 565 are loaded on to mail containers 570 in pre-sort groupings as required, before delivery to the postal authority. Mail containers maybe, but are not limited to trays, tubs, sacks or mail carriers.

FIGS. 6 and 7 provide functional block diagram illustrations of general purpose computer hardware platforms used to implement the move update process 100, FIG. 1. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and, as a result, the drawings should be self-explanatory.

For example, a control computer may be a PC based implementation of a central control processing system like that of FIG. 7, or may be implemented on a platform configured as a central or host computer or server like that of FIG. 6. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for updating address data in a print file record for a mail document before the mail document is printed and inserted into an envelope, the method comprising steps of:
    extracting initial address data of the mail document from the print file record;
    performing, by a processor, address quality analysis, delivery point validation and move update address analysis on the initial address data contained within the print file record for move update processing to identify the presence of a move update requirement;
    for at least one identified move update requirement, creating move update address contextual data and move update postal authority barcode data containing postal authority delivery point data;
    deleting an initial address data postal authority barcode if present within the initial address data for the at least one identified move update requirement, or not deleting the initial address data postal authority barcode if not present within the initial address data for the at least one identified move update requirement;
    appending the move update address contextual data and the move update postal authority barcode data to associated extracted initial address data, the appended data is stored in a format suitable for printing initial address information together with the move address contextual data and move update postal authority barcode on the mail document;
    printing the initial address information together with the move address contextual data and move update postal authority barcode on the mail document;
    loading the mail document onto mail inserting equipment; and
    manufacturing a mail piece containing the mail document, wherein
    the manufactured mail piece is a windowed envelope and the printed initial address information, move update address contextual data and move update postal authority barcode are each visible through the windowed envelope.

2. The method according to claim 1, wherein the creating step further includes:
    obtaining updated move address data and updated delivery point data from a postal authority change of address database.

3. The method according to claim 1, wherein the storing step further includes:
    replacing existing barcode data with the barcode data derived from the postal authority delivery point data.

4. The method according to claim 1, wherein the step of creating move address contextual data includes:
    creating data including one or more of street address, 5 digit ZIP or machine information associated with a move update process.

5. The method according to claim 1, wherein the printed move update address information is printed above or below the printed initial address information.

6. The method according to claim 1, wherein the move update postal authority barcode includes a postnet barcode, intelligent mail barcode (IMB) or other postal authority barcode and move update address contextual data in an approved postal authority format.

7. The method according to claim 1, wherein the address quality analysis and delivery point validation are postal authority approved processes.

8. A method for updating address data for a mail piece, the method comprising steps of:
    performing, by a processor, move update address analysis on initial address data contained within an initial address list for move update processing to identify the presence of a move update requirement;
    for at least one identified move update requirement, creating move update address contextual data and move update postal authority barcode data containing move update postal authority delivery point data;
    appending the move update address contextual data and the move update postal authority barcode data to associated initial address data, the appended data is stored in a format suitable for printing initial address information together with the move update address contextual data and move update postal authority barcode on a manufactured mail piece;
    manufacturing the mail piece on an inserter; and
    printing the initial address information together with the move update address contextual data and move update postal authority barcode in an address block section of the manufactured mail piece.

9. The method according to claim 8, wherein the mail item is selected from a closed first class or standard class envelope, flyer, magazine, periodical, a folded and tabbed item or advertisement.

10. The method according to claim 9, wherein the printed move update address information is printed above or below the printed initial address information.

11. The method according to claim 8, wherein the printing step is performed by an ink jet printer.

12. The method according to claim 8, wherein the creating step further includes:
    obtaining updated move address data and updated delivery point data from a postal authority change of address database.

13. The method according to claim 8, wherein the printed move update address information includes a postnet barcode or intelligent mail barcode (IMB) and move update address contextual data.

14. A system for updating address data on a mail document, the system comprising:
- initial address data stored within a print file record for move update processing;
- a processor associated with the stored address data contained in the print file record and move update processing records, the processor configured to perform steps of:
  - performing move update address analysis on the initial address data extracted from the print file record and utilizing the move update processing records to identify the presence of a move update requirement;
  - for at least one identified move update requirement, creating move update address contextual data and move update postal authority barcode data containing move update postal authority delivery point data; and
  - appending the move update address contextual data and the move update postal authority barcode data to associated initial address data; and
  - updating a print file, the print file suitable for causing a printer to print a mail document, such that the mail document includes initial address information together with move update address contextual data and move update postal authority barcode;
- a printer for printing the initial address information together with the move update address contextual data and move update postal authority barcode on the mail document; and
- an inserter for inserting the printed mail document into an envelope such that the printed initial address information together with the move update address contextual data and move update postal authority barcode are each visible through a window of the envelope.

15. The system according to claim 14, wherein the processor obtains updated move address data and updated delivery point data from a postal authority change of address database.

16. The system according to claim 14, wherein the address data is stored in a database.

17. The system according to claim 14, wherein the printer is an ink jet printer.

18. The system according to claim 14, wherein the printed move update postal authority barcode includes a postnet barcode or intelligent mail barcode (IMB).

* * * * *